US012415187B2

(12) United States Patent
Bettenworth et al.

(10) Patent No.: US 12,415,187 B2
(45) Date of Patent: Sep. 16, 2025

(54) KEY GRINDING PAN SEGMENT, GRINDING PAN SEGMENT SYSTEM, AND METHOD FOR SAME

(71) Applicant: LOESCHE GMBH, Düsseldorf (DE)

(72) Inventors: Jörg Bettenworth, Düsseldorf (DE); Michael Keyssner, Düsseldorf (DE)

(73) Assignee: LOESCHE GMBH, Düsseldorf (DE)

( * ) Notice: Subject to any disclaimer, the term of this patent is extended or adjusted under 35 U.S.C. 154(b) by 0 days.

(21) Appl. No.: 17/996,273

(22) PCT Filed: Apr. 16, 2020

(86) PCT No.: PCT/EP2020/060674
§ 371 (c)(1),
(2) Date: Oct. 14, 2022

(87) PCT Pub. No.: WO2021/209133
PCT Pub. Date: Oct. 21, 2021

(65) Prior Publication Data
US 2023/0191418 A1 Jun. 22, 2023

(51) Int. Cl.
*B02C 15/00* (2006.01)

(52) U.S. Cl.
CPC ........ *B02C 15/003* (2013.01); *B02C 2210/02* (2013.01)

(58) Field of Classification Search
CPC ............................ B02C 15/007; B02C 15/003
See application file for complete search history.

(56) References Cited

U.S. PATENT DOCUMENTS

| | | | | |
|---|---|---|---|---|
| 347,232 A * | 8/1886 | Dougan | B02C 15/007 | 241/118 |
| 412,568 A * | 10/1889 | Vaughn | B02C 15/007 | 241/117 |
| 1,110,222 A * | 9/1914 | Morat | B02C 15/007 | 241/117 |
| 2,689,689 A * | 9/1954 | Engler | B02C 15/007 | 241/121 |
| 3,061,208 A * | 10/1962 | Schauer | B02C 15/007 | 241/117 |

(Continued)

FOREIGN PATENT DOCUMENTS

| | | |
|---|---|---|
| CN | 203018137 U | 6/2013 |
| CN | 110773277 A | 2/2020 |

(Continued)

OTHER PUBLICATIONS

Chinese First Office Action & Search Report dated May 23, 2023, relating to CN Patent Application No. 202080099816.8.

*Primary Examiner* — Bobby Yeonjin Kim
(74) *Attorney, Agent, or Firm* — DINSMORE & SHOHL LLP

(57) ABSTRACT

The invention relates to a replaceable key grinding pan segment for a grinding track of a grinding pan of a roller mill, the grinding track having an annular shape with an outer circumference and an inner circumference around a center point. The length of the inner edge of the key grinding pan segment closer to the center point is greater here than the length of the outer edge further from the center point. The invention also relates to a grinding pan segment system, a roller mill, and a method for replacing grinding pan segments.

12 Claims, 3 Drawing Sheets

(56) References Cited

U.S. PATENT DOCUMENTS

| | | | | | |
|---|---|---|---|---|---|
| 3,138,337 | A * | 6/1964 | Bogot | B02C 15/04 241/300 |
| 3,409,236 | A * | 11/1968 | Hamilton | B02C 15/005 241/294 |
| 3,782,646 | A * | 1/1974 | Brundiek | B02C 15/007 241/110 |
| 4,382,558 | A * | 5/1983 | Svensson | B02C 25/00 241/121 |
| 4,600,157 | A * | 7/1986 | Willach | F23K 1/00 241/59 |
| 2009/0011913 | A1 * | 1/2009 | Lin | B02C 15/007 492/58 |
| 2011/0114769 | A1 * | 5/2011 | Wark | B02C 15/001 241/19 |
| 2017/0361328 | A1 * | 12/2017 | Colson | B02C 15/003 |

FOREIGN PATENT DOCUMENTS

| | | | | | |
|---|---|---|---|---|---|
| CN | 211070290 | U | | 7/2020 | |
| DE | 1507629 | A1 | | 4/1969 | |
| DE | 8204278 | U1 | | 6/1982 | |
| DE | 3415072 | | * | 10/1985 | B02C 15/007 |
| GB | 761696 | A | | 11/1956 | |
| GB | 1114923 | A | * | 5/1968 | B02C 15/007 |

* cited by examiner

KEY GRINDING PAN SEGMENT, GRINDING PAN SEGMENT SYSTEM, AND METHOD FOR SAME

The invention relates to a key grinding pan segment for a grinding track of a grinding pan of a roller mill. Here, the grinding track has an annular form with an outer circumference and a smaller inner circumference around a center point. The replaceable key grinding pan segment has an outer edge and an inner edge as well as two connection edges connecting the outer and inner edges.

Furthermore, the invention relates to a grinding pan segment system for a grinding track of a grinding pan of a roller mill with a plurality of standard grinding pan segments of the same size and shape, each having an inner edge and an outer edge which are connected by two connection edges. The length of the inner edge is shorter here than the length of the outer edge.

Lastly, the invention also relates to a method for removing grinding pan segments from a grinding pan with a grinding pan segment system.

Common roller mills have a grinding pan that rotates under the stationary, rotatably mounted grinding rollers. The grinding pan has a grinding track on which the grinding rollers roll. During operation, the material to be milled to be comminuted is located between the grinding pan or the grinding track and the grinding rollers. The grinding rollers act by the force of their own weight, but are sometimes also subjected to additional force, so that they press on the grinding track and thus on the grinding pan. During operation, wear occurs on the one hand on the grinding rollers and on the other hand also on the grinding track due to the forces that occur and the material abrasion caused by the material to be milled. For this reason, the grinding track is designed to be replaceable in most roller mills.

Usually, the annular grinding track has exchangeable segments of the same size, which have a form similar to a piece of cake. This means that they are trapezoidal and have a greater length at their outer edge than at their inner edge. Specifically, both the outer edge and the inner edge describe an arc shape, which is due to the annular design of the grinding track. However, it is also possible to design the inner and outer edges straight, so that the grinding track forms a polygonal shape which approximates an annular shape. A grinding pan is often also referred to as a grinding table or grinding plate. Similarly, the grinding pan segments are also referred to as grinding table plates or plate segments. The grinding pan segments are also often referred to as grinding plates or grinding table plating.

The problem with common grinding pan segment systems is their replacement.

During operation, the rolling of the grinding rollers on the grinding track causes material to be milled to be pressed into the space between the segments, i.e. the region where two adjacent segments touch. Although efforts are of course made to make this edge as low and small as possible, the considerable forces that occur during the grinding process cannot prevent material to be milled, especially material to be milled that has already been comminuted to a very small size, from penetrating there. Due to the forces during grinding, this penetrated ground material becomes solidified and very strongly compressed and thus hard.

To replace the grinding plates, it is now necessary to first remove one segment, then the other segments. However, this first segment cannot be pulled inwards, as this is geometrically impossible due to the standard design with a larger outer edge and a smaller inner edge. Pressing outwards from the grinding pan is normally not possible due to the design of most grinding pans. Usually, an attempt is made to lift the grinding pan segment upwards by trying to press against it from below after removing a clamping ring with which the grinding pan segments are fastened to the grinding pan.

However, this is very difficult due to the pressed-in material to be milled, so that removal of the first segment often takes several hours or even days. It is not unusual for the edge or joint between two adjacent grinding pan segments to be machined here by flame cutting with the aid of a so-called gouging plane.

Generic grinding pan segments of the kind in question can be found, for example, in DE 1507629 or DE 1507580.

The object of the invention is therefore to provide a grinding pan segment, a grinding pan segment system, and a method for replacing grinding pan segments which facilitate the replacement process.

This object is achieved in accordance with the invention by a key grinding pan segment system for a grinding track of a grinding pan of a roller mill having multiple grinding pan segments each having an inner edge and an outer edge, which are connected by two connection edges, wherein the length of the inner edge is smaller than the length of the outer edge, having at least one exchangeable key grinding pan segment for the grinding track of the grinding pan of the roller mill, wherein the grinding track has an annular shape with an outer circumference and a smaller inner circumference around the center point, having an outer edge and an inner edge as well as two connection edges connecting the outer and inner edges, wherein the length of the inner edge closer to the center point is greater than the length of the outer edge further away from the center point, and having at least one compensating grinding pan segment which is arranged next to the key grinding pan segment, wherein the length of a circular arc formed by the key grinding pan segment decreases as the radius from the inner edge to the outer edge increases, whereby the shape of the key grinding pan segment is a shape similar to an inverted piece of cake, wherein the grinding pan segments are formed as standard grinding pan segments of the same size and shape, and in that the key grinding pan segment and the at least one compensating grinding pan segment together form the shape of one or more standard grinding pan segments, and a method for removing grinding pan segments from a grinding pan of the aforementioned grinding pan segment system further comprising a clamping ring and a baffle ring, wherein the clamping ring and the baffle ring are removed, in that a pressing tool is attached to a press recess of the key grinding pan segment, in that the key grinding pan segment is pressed in the direction of the grinding pan center by means of the pressing tool, and in that the further grinding pan segments are subsequently removed.

Advantageous embodiments of the invention are indicated in the dependent claims and in the description as well as in the figures and their explanation.

In the key grinding pan segment according to the invention, it is provided that the length of the inner edge closer to the center point is greater than the length of the outer edge further from the center point.

The invention is based on the basic concept of deviating from the conventional form used until now. The replaceable key grinding pan segment is dimensioned in such a way that, when pushed toward the grinding pan center point, it no longer becomes wedged due to its geometric shape, thus making it possible to remove the key grinding pan segment in this way.

Another advantage of this design is also that the gap between the key grinding pan segment and its connection edges to the neighboring grinding pan segments is automatically enlarged or the problems caused by solidified material to be milled are thus minimized or do not occur in this form.

Advantageously, the outer edge of the key grinding pan segment forms a circular arc on the outer circumference and the inner edge of the key grinding pan segment forms a circular arc on the inner circumference of the grinding pan. In other words, the dimensions of the key grinding pan segment fit the grinding track of the grinding pan, wherein the tip, however, is missing.

Furthermore, the length of a circular arc formed by the key grinding pan segment may decrease as the radius increases from the inner edge to the outer edge. Thus, the shape of the key grinding pan segment is a shape similar to an inverted piece of cake.

It is preferable if a press recess is provided on the outer edge of the key grinding pan segment for placement of a press for the replacement process. By means of this press recess, a pressing tool can be applied and can press the key grinding pan segment in the direction of the center point of the grinding pan. The pressing tool can be applied here between the press recess and the edge of the main body of the grinding pan.

In an advantageous embodiment, the press recess is formed in such a way that it can be covered by a retention rim component during operation. This means that it is designed in such a way that, if possible, the design prevents material to be milled from being pressed into the press recess.

In the context of the invention, the term "during operation" can be understood to mean roller mill that is ready for use. This means, in particular, that the grinding pan is fully assembled at least on the mill side, i.e. a grinding track with a retention rim is present.

The invention further relates to a grinding pan segment system for a grinding track of a grinding pan of a roller mill with a plurality of grinding pan segments, each having an inner edge and an outer edge. The two edges are connected by two connection edges. The length of the inner edges is less than the length of the outer edge. Thus, the standard grinding pan segments have a form similar to a piece of cake, but lack the tip.

According to the invention, it is provided that the grinding pan segment system further comprises at least one key grinding pan segment according to the invention and at least one compensating grinding pan segment arranged adjacently to the key grinding pan segment.

By providing a key grinding pan segment in a grinding pan segment system, it is made possible that the grinding pan, which is constructed from the grinding pan segment system, or the rolling surface of the rollers can be replaced relatively easily without the need for time-consuming removal and comminution of material from the joints as previously described in the prior art.

It is advantageous if the grinding pan segments are formed as standard grinding pan segments of the same size and shape, and the key grinding pan segment and the at least one compensating grinding pan segment together form the shape of one or more standard grinding pan segments.

Through this dimensioning of the replaceable key grinding pan segment and the provision of a compensating grinding pan segment, which together form the shape of one or more standard grinding pan segments, it can be achieved that all other standard grinding pan segments can be configured in the same way. This facilitates stock-keeping and means that few different grinding pan components need to be kept in stock. Conventional segments can also continue to be used for this purpose.

Grinding pan segments can also be referred to as grinding plates.

Preferably, two compensating grinding pan segments are provided in an arrangement to the left and right of the key grinding pan segment. In this case, the two compensating grinding pan segments can be designed substantially mirror symmetrical with respect to an axis on the radius of the grinding pan through the key grinding pan segment. This axis can, for example, be the axis of symmetry on the radius of the key grinding pan segment.

Such a design makes it easy to achieve the size of one or more standard grinding pan segments with one key grinding pan segment and two compensating grinding pan segments. This is further simplified by the provision of mirror-symmetrically constructed compensating grinding pan segments.

Preferably, two compensating grinding pan segments with the key grinding pan segment have the size of one, two or three standard grinding pan segments.

In another embodiment, the grinding pan segments can also be formed as compensating grinding pan segments. In this case, several key grinding pan segments are provided. It is preferred here that an equal number of compensating grinding pan segments and key grinding pan segments are provided. In other words, each key grinding pan segment is followed by a compensating grinding pan segment. In this respect, standard grinding pan segments, as previously described, are no longer used. According to this embodiment, it is also possible to consider the compensating grinding pan segments as a combination, as described in the previous embodiment, of standard grinding pan segments with compensating grinding pan segments, provided that they are formed in one piece. In this case, it is merely necessary to have two different grinding pan segment types.

Another advantage results from that a plurality of key grinding pan segments are provided, so that it is irrelevant in what position the grinding pan has come to a stop in relation to the grinding rollers arranged above it. Otherwise, care must be taken to ensure that the key grinding pan segment does not come to a stop in the region of a roller, as disassembly would then be complicated and ideally the bowl would have to be turned further.

It is advantageous if the grinding pan segments, i.e. the standard grinding pan segments, the key grinding pan segment(s) and/or the compensating grinding pan segments can be fastened to the grinding pan by means of a single-part or multi-part designed clamping ring. According to the design, it is provided that the clamping ring abuts against the inner circumference of the grinding track, i.e. against the inner edge of the grinding pan segments, and thus presses the grinding pan segments outward against an edge of the grinding pan base or main body.

The invention further relates to a roller mill with a grinding pan, wherein the grinding pan comprises a grinding pan segment system according to the invention.

A roller mill of this type has the advantage that when the grinding track, i.e. the individual grinding pan segments, is replaced and newly installed, this can be done much more quickly than with conventional grinding pan segments. This is due to the fact that the key grinding pan segment can be removed from the grinding track very easily and it is hardly necessary to remove the material to be milled that has accumulated at the edge between the key grinding pan segment and the adjacent segments before removing the key grinding pan segment.

Lastly, the invention also relates to a method for removing a grinding pan segment from a grinding track of a grinding pan of a roller mill having a grinding pan segment system according to the invention. In this case, it is provided that first the clamping ring and the baffle ring are removed from the grinding pan. Thus, the press recess of the key grinding pan segment according to the invention is now open. Now, a pressing tool can be applied to the press recess and the key grinding pan segment can be pressed toward the center of the grinding pan. The main body of the grinding pan serves here as a counter bearing.

The space in which the key grinding pan segment is pressed was previously occupied by the clamping ring. After the key grinding pan segment has been removed, the remaining grinding pan segments can be removed. Here, too, it is no longer necessary to first clean solidified material to be milled from the edge or the groove between two adjacent grinding pan segments, as on one side there is never a further grinding pan segment, and therefore a slight slipping movement on this side provides enough clearance.

The invention is explained hereinafter by means of a schematic exemplary embodiment and with reference to the figures, in which.

Figure 1:
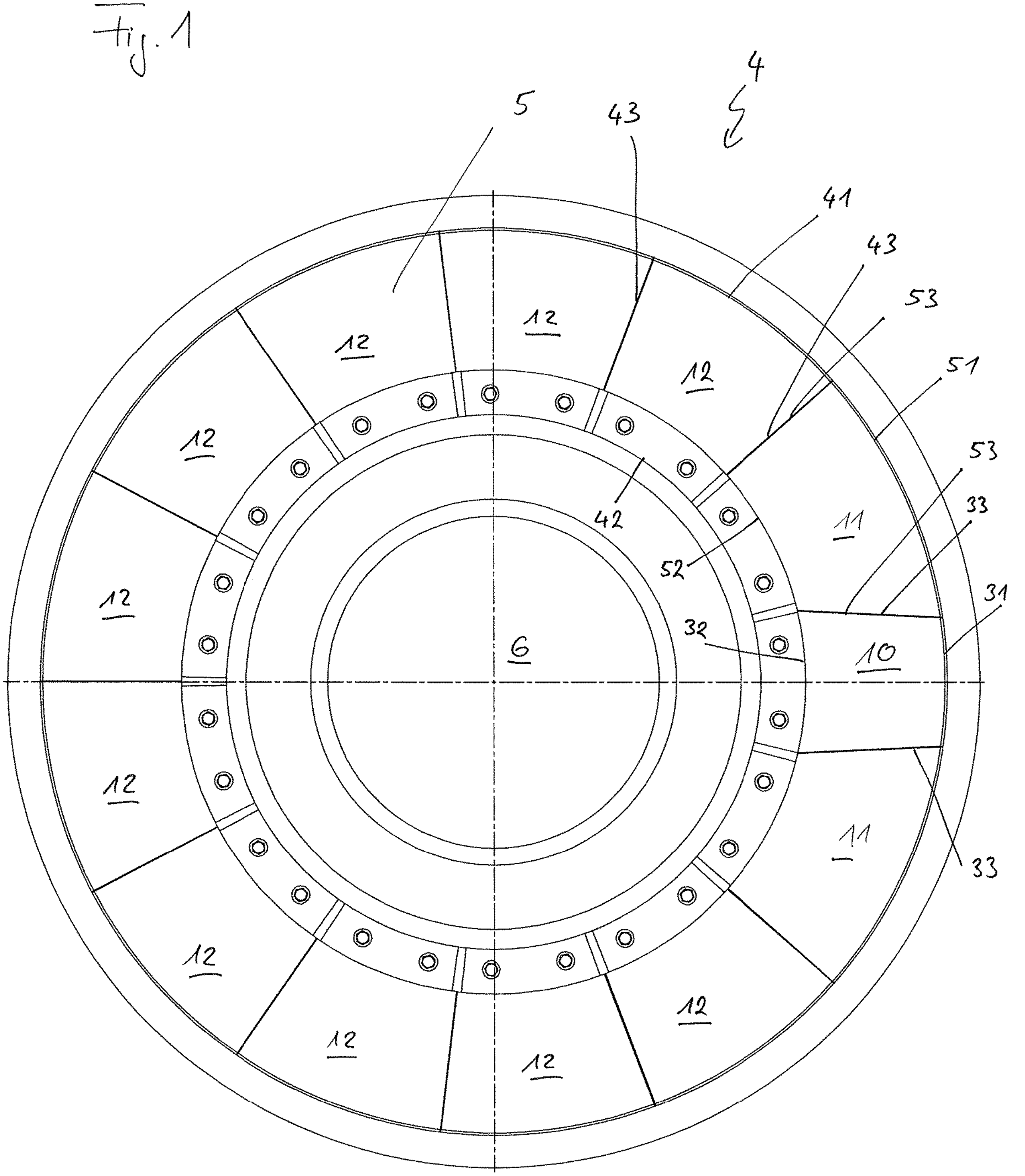
FIG. 1 shows a schematic plan view of a grinding pan with a grinding track according to a first embodiment.

FIG. 1 shows a schematic view of a topview on a grinding pan 4 with a grinding track 5 according to a first embodiment. The grinding track 5 is composed of a key grinding pan segment 10, two mirror-symmetrically shaped compensating grinding pan segments 11 and ten standard grinding pan segments 12.

The key grinding pan segment 10 has an outer edge 31, an inner edge 32 and two lateral connection edges 33. Similarly, the standard grinding pan segments 12 also have an outer edge 41, an inner edge 42 and two connection edges 43. The same is also the case with the two compensating grinding pan segments 11, which have an outer edge 51, an inner edge 52 and two connection edges 53. As shown in FIG. 1, the outer edge 31 of the key grinding pan segment 10 according to the invention has a shorter length than its inner edge 32. This allows the key grinding pan segment 10 to be pushed inward toward the grinding pan center 6.

As can be seen by a person skilled in the art, this offers the advantage that pushing the key grinding pan segment 10 inward increases the free space between the connection edges 33 of the key grinding pan segment 10 and the adjacent connection edges 53 of the compensating grinding pan segment 11. This also means that material to be milled pressed herein cannot prevent the key grinding pan segment from being pushed inward.

Together with the two adjacent compensating grinding pan segments 11, the key grinding pan segment 10 is the size of two normal standard grinding pan segments 12. This means that standard elements can be used for the rest of the grinding track.

Figure 2:
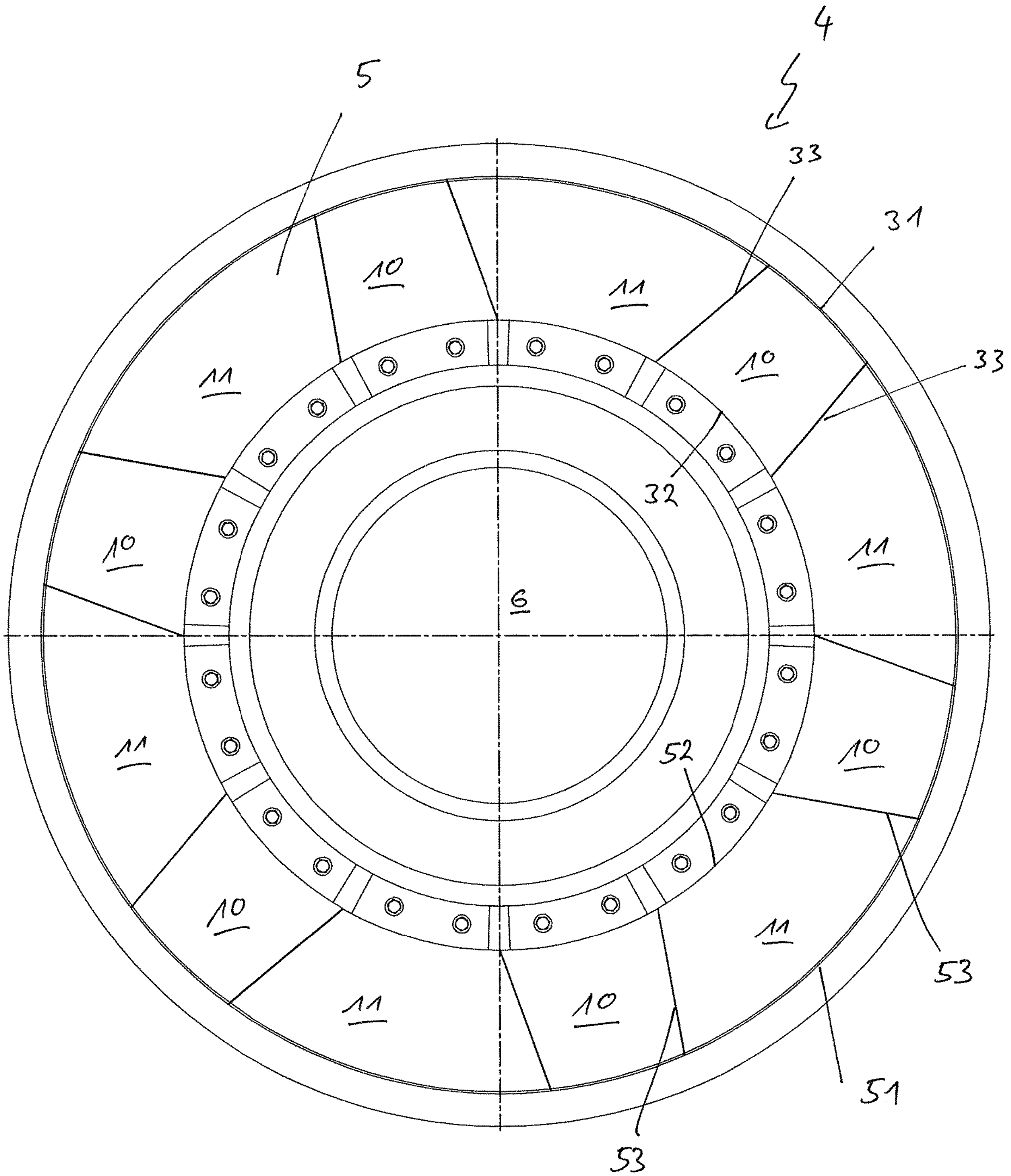
FIG. 2 shows a schematic plan view of a grinding pan with a grinding track according to a second embodiment.

FIG. 2 shows an alternative embodiment of the grinding pan 5. In the following, only the differences from the embodiment according to FIG. 1 will be discussed. The grinding pan 5 according to this embodiment has, by way of example, six key grinding pan segments 10 and, by way of example, six compensating grinding pan segments 11. These are respectively arranged alternately on the grinding pan 5. As can be seen in combination with the embodiment in FIG. 1, the standard grinding pan segments 12 are omitted here. However, in contrast to the embodiment according to FIG. 1, only two different types of grinding pan segments are used. This simplifies stock-keeping. Another advantage of this embodiment is that the first key grinding pan segment 10, which is removed by pushing it inward toward the grinding pan center 6, can be freely selected. This is particularly interesting because in an unfavorable case, when the mill is stopped, a key grinding pan segment 10 could come to lie exactly under the roller, so that the mill would have to be started up again. In the embodiment according to FIG. 2, this is much less likely, as the pitch of the grinding pan segments is much larger than the number of grinding rollers.

Figure 3:
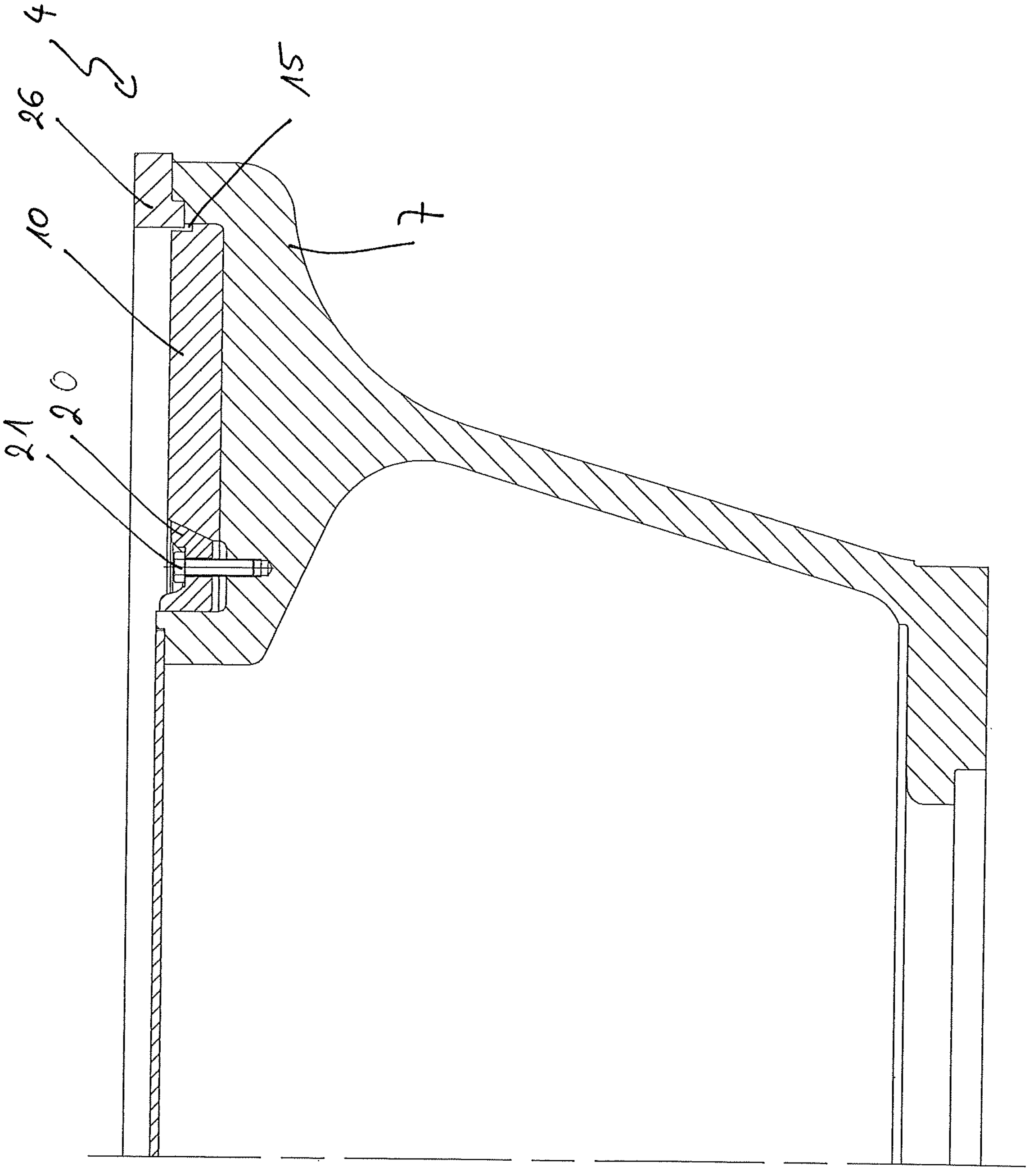
FIG. 3 shows a sectional view through a grinding pan with a grinding track.

FIG. 3 shows a sectional view through a grinding pan 4. Here, a press recess 15 is shown in the right-hand region of the key grinding pan segment 10. This is covered by a retention rim 26. The position of the retention rim 26 ensures that hardly any or at least only very little material to be milled enters the press recess 15 during operation, i.e. during the grinding processes.

The key grinding pan segment 10 itself is arranged and secured in an indentation in the grinding pan body 7 by means of a clamping ring 20.

To install the grinding track 5, the key grinding pan segment 10 is inserted in this case, then the clamping ring 20 is attached. This is fastened by means of a screw 21. Due to its wedge shape, the clamping ring presses the key grinding pan segment 10 against the outer edge of the grinding pan when the screw 21 is tightened. The other grinding pan segments 11, 12 are fastened in a similar way before or after this.

For removal, this process is carried out in reverse order. Here it is essential that the key grinding pan segment 10 is removed first before the other grinding pan segments 11, 12. To do this, the screw 21 is loosened first, so that the clamping ring 20 can be removed. Simultaneously, before, or after, the baffle ring 26 is also removed. Then a pressing tool can be inserted into the press recess 15 and thus the key grinding pan segment 10 can be pressed into the space in which the clamping ring 20 was previously located. After the key grinding pan segment 10 has been removed, the other grinding pan segments 11, 12 can also be removed relatively easily.

With the key grinding pan segment according to the invention, the grinding pan segment system according to the invention, as well as the method according to the invention, it is possible to significantly simplify the replacement of grinding pan segments of a grinding track of a roller mill and to perform this within a shorter time.

The invention claimed is:

1. A grinding pan segment system for a grinding track of a grinding pan of a roller mill comprising multiple grinding pan segments each having an inner edge and an outer edge, which are connected by two connection edges, wherein the length of the inner edge is smaller than the length of the outer edge, at least one exchangeable key grinding pan segment for the grinding track of the grinding pan of the roller mill, wherein the grinding track has an annular shape with an outer circumference and a smaller inner circumference around the center point, and having at least one compensating grinding pan segment which is arranged next to the key grinding pan segment, wherein the length of a circular arc formed by the key grinding pan segment decreases as the radius from the inner edge to the outer edge increases, whereby the shape of the key grinding pan segment is a shape similar to an inverted piece of cake, wherein the grinding pan segments are formed as standard grinding pan segments of the same size and shape, and in that the key grinding pan segment and the at least one compensating grinding pan segment together form the shape of one or more standard grinding pan segments.

2. The grinding pan segment system according to claim 1, wherein:

the outer edge of the key grinding pan segment forms a circular arc on the outer circumference and the inner edge of the key grinding pan segment forms a circular arc on the inner circumference.

3. The grinding pan segment system according to claim 1, wherein:

a press recess is provided on the outer edge for placement of a pressing tool for a replacement process.

4. The grinding pan segment system according to claim 3, wherein:

the press recess can be covered by a retention rim component during operation.

5. The grinding pan segment system according to claim 1, wherein:

two compensating grinding pan segments are provided in an arrangement to the left and right of the key grinding pan segment.

6. The grinding pan segment system according to claim 5, wherein:

the two compensating grinding pan segments are substantially mirror symmetrical with respect to an axis on the radius of the grinding track through the key grinding pan segment.

7. The grinding pan segment system according to claim 1, wherein:

two compensating grinding pan segments and one key grinding pan segment have the size of one, two or three standard grinding pan segments.

8. The grinding pan segment system according to claim 1, wherein:

the grinding pan segments are formed as a compensating grinding pan segment, and in that a plurality of key grinding pan segments are provided.

9. The grinding pan segment system according to claim 8, wherein:

the same number of compensating grinding pan segments and key grinding pan segments are provided.

10. The grinding pan segment system according to claim 8, wherein:

the key grinding pan segment, the compensating grinding pan segment and/or the standard grinding pan segments can be fastened on the grinding pan by means of a single-part or multi-part clamping ring.

11. A roller mill comprising a grinding pan, wherein:

the grinding pan has a grinding pan segment system according to claim 1.

12. A method for removing grinding pan segments from a grinding pan having a grinding pan segment system according to claim 1, further comprising a clamping ring and a baffle ring, wherein:

the clamping ring and the baffle ring are removed, in that a pressing tool is attached to a press recess of the key grinding pan segment, in that the key grinding pan segment is pressed in the direction of the grinding pan center by means of the pressing tool, and in that the further grinding pan segments are subsequently removed.

* * * * *